Patented Jan. 5, 1937

2,066,730

UNITED STATES PATENT OFFICE 2,066,730

3-NITRO- AND 3-AMINO-DERIVATIVES OF 4.6-DIAMINOQUINOLINES

Heinrich Jensch, Frankfort-on-the-Main, Germany, assignor to Winthrop Chemical Company, Inc., New York, N. Y., a corporation of New York No Drawing. Application September 20, 1934, Serial No. 744,861. In Germany September 28, 1933

7 Claims. (Cl. 260—38)

The present invention relates to 3-nitro- and 3-amino derivatives of 4.6-diaminoquinolines.

I have found that derivatives of 4.6-diaminoquinolines containing a nitro- or amino group in the 3-position are of particular importance as therapeutics and as starting materials for therapeutics. The hitherto unknown compounds have the general formula:

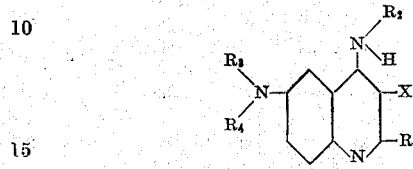

in which X stands for the nitro- or amino group, $R_1$ for methyl or hydrogen, $R_2$ for alkyl or hydrogen, $R_3$ for acyl or hydrogen, $R_4$ for alkyl or hydrogen.

The alkyl groups may be, for instance, the methyl-, ethyl-, propyl- or butyl-groups. The acyl groups may be acetyl, propionyl, butyryl, benzoyl, cinnamoyl, also radicals of polybasic carboxylic acids, such as those of carbonic acid, oxalic acid, fumaric acid, succinic acid and the substitution products thereof. The new nitro-products may be made by nitrating the 4.6-diaminoquinolines described in German Patent No. 591,480, such as 4-amino-6-acetylaminoquinaldines, 4-ethylamino-6-aminoquinaldines, 6-ethylamino-4-aminoquinaldines and the like (see for instance Examples 2, 3 and 4 of said patent). The amino compounds are produced by reducing the nitro-compounds thus obtained. The 3-nitro compounds are obtained in a yield of about 86 per cent. of the theory, only undefined by-products being eliminated from the mother liquids. Especially the 6-acylamino-3.4-diaminoquinolines are distinguished by the same good chemo-therapeutic effects as the starting materials and partly still have a strong efficacy against blood parasites.

The following examples illustrate the invention, but they are not intended to limit it thereto:

1. 12.5 g. of hydrochloride of 4-amino-6-acetylaminoquinaldine (see German Patent No. 591,480, Example 2) are introduced at 15° C. to 20° C., while stirring, into 120 g. of monohydrate. 5 g. of potassium nitrate are then gradually added at a temperature of 20° C. to 25° C., while further stirring. After about ¼ hour the whole is poured on ice and the solution obtained is mixed with a saturated sodium chloride solution. The yellowish hydrochloride of the base of the following formula:

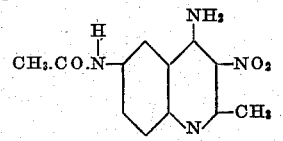

which soon crystallizes is filtered with suction and washed with a very dilute sodium chloride solution and a small amount of ice-cold water. From the aqueous solution of the salt, ammonia precipitates the base as a golden-yellow powder which, after recrystallization from ethanol and butanol, melts at 265° C., while assuming a dark coloration. By a short boiling with dilute hydrochloric acid the acetyl group may be split off and the 3-nitro-4.6-diaminoquinaldine may be obtained.

36 g. of the hydrochloride of the acetylated base named above are gradually introduced, while stirring, into a suspension of 25 g. of iron powder in water heated in a water bath. After the reduction is finished the whole is filtered in a hot condition and the solution is mixed with saturated sodium chloride solution. On cooling, a colorless, thick magma of the hydrochloride of the base of the following formula:

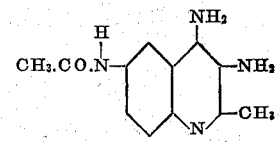

is obtained which is filtered by suction and washed with dilute sodium chloride solution and a small amount of ice-cold water. The yield amounts to 29 grams. The salt readily dissolves in water with a yellowish coloration, strongly diluted solutions have a blue fluorescence, the alcoholic solution has a violet fluorescence. Aqueous solutions of the salt have an alkaline reaction to litmus paper. Ammonia precipitates therefrom the base which, after recrystallization from water, melts at 284° C., while assuming a dark coloration. By mixing the new base in a weakly hydrochloric acid solution with the calculated quantity of a sodium nitrite solution, a colorless, fine crystalline magma precipitates after addition of sodium acetate solution. The new body melts, after recrystallization from alcohol at 320° C., while assuming a black coloration, readily dissolves in aqueous ammonia and in caustic soda solution as well as an excess of hydrochloric acid and is insoluble in dilute acetic acid. It represents the azimido compound:

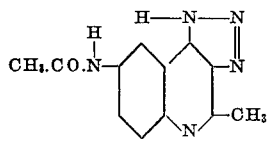

The saponified base melts at 325° C. to 327° C., while assuming a black coloration and while foaming. The facts that the new acetyltriaminoquinaldine does not couple with diazo compounds and that it forms an azimido compound which, after splitting off the acetyl group, contains a diazotizable amino group can only be explained by the new amino group standing in the 3-position. On boiling the new compound in an alcoholic solution which had been mixed with a small quantity of concentrated hydrochloric acid, the hydrochloride of the 3.4.6-triaminoquinaldine is formed which is sparingly soluble in alcohol. It is very readily soluble in water with a violet fluorescence and melts at 289° C.

2. 8.6 g. of 4.6-diaminoquinaldine are introduced, while cooling on ice, into 40 cc. of concentrated sulfuric acid. 5 g. of potassium nitrate are then gradually added thereto, while agitating and cooling to −10° C. to −5° C. After a short time a test taken shows on neutralizing a yellowish-red precipitate, which is soluble in caustic soda solution and ammonia and which is again precipitated by means of acetic acid. Obviously a nitramine has first been formed. If the freezing mixture is then eliminated and the temperature is slowly raised to room temperature a test taken then shows a deep red precipitate on addition of an excess of a solution of caustic soda. After 2 hours' standing the whole is poured on ice, made alkaline by means of a solution of caustic soda, the brown-red precipitate is filtered with suction and washed with water. It is dissolved in hot, strongly dilute acetic acid; from the clearly filtered solution the red base of the following constitution—

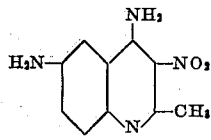

is precipitated by addition of ammonia. It melts, after crystallization from aqueous alcohol, at 225° C. to 226° C. and with an excess of hydrochloric acid it forms a salt which is sparingly soluble in alcohol and nearly colorless and which is readily soluble in water with a reddish-yellow color. By a reduction, as described in Example 1, the triaminoquinaldine mentioned at the end of Example 1 is obtained therefrom.

3. To a solution of 6.5 g. of 3-nitro-4.6-diaminoquinaldine in 50 cc. of glacial acetic acid there are added, while stirring and heating in the water bath, 5 g. of cinnamic acid chloride. A thick, light yellow magma of the hydrochloride of the 6-cinnamoyl compound results which is diluted with about 50 cc. of water and which is reduced with iron powder while further stirring and heating it. When the reduction is complete during which operation dissolution occurs the whole is filtered in a hot condition, the filtrate is mixed with hydrochloric acid and a small quantity of sodium chloride solution is added thereto. A colorless precipitate of the hydrochloride of the following formula:

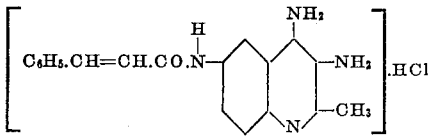

is formed. This salt is soluble in water with a yellowish coloration. The yellowish base melts, when recrystallized from alcohol and water, at 262° C. to 263° C., while assuming a dark coloration.

4. 14.5 g. of 2-methyl-3-nitro-4.6-diaminoquinoline, dissolved in 150 cc. of glacial acetic acid, are caused to react with 5.1 g. of fumaric acid chloride as indicated in Example 3. The thick magma obtained is then diluted with about ½ liter of water and reduced with iron powder, while heating and stirring it. The whole is then filtered in a hot condition, the filtrate is acidified with hydrochloric acid and the yellow hydrochloride of the following formula:

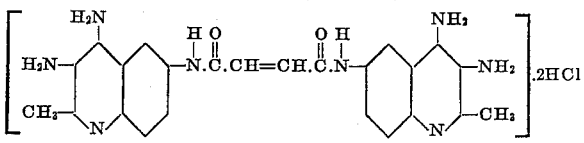

which has been salted out thereby is filtered with suction and washed with dilute hydrochloric acid. It dissolves on heating in water with a yellowish coloration; the acidified solution yields, on addition of nitrite, a jellylike azimido compound which dissolves in a caustic soda solution with a yellow coloration. Ammonia precipitates the base as a dark yellow jelly which, after drying, forms a yellow powder, which is scarcely soluble in the usual solvents and melts at 270° C., while assuming a black coloration.

5. Into an aqueous suspension of 22 g. of 3-nitro-4.6-diaminoquinaldine in about 200 cc. of water phosgene is introduced while stirring and heating in the water bath. After an acid reaction has occurred the whole is made alkaline with a caustic soda solution, while further introducing phosgene. This is repeated until a test no longer shows a free 6-amino group. The reaction mass which has been rendered acid by addition of hydrochloric acid is filtered in a hot condition and washed with dilute hydrochloric acid. It represents the hydrochloride of the dinitroaminoquinaldyl urea which is reduced with iron powder in 20 times the quantity of acetic acid of 50 per cent. strength, while stirring and boiling in the water bath. The hot solution is filtered, the filtrate is made acid to Congo paper with the aid of hydrochloric acid and mixed with a solution of sodium chloride. The practically colorless hydrochloride of the following formula:

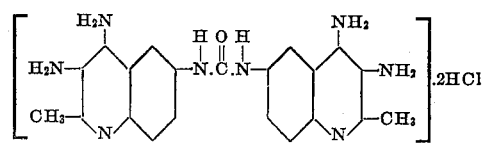

is precipitated thereby; it is filtered with suction and washed with dilute hydrochloric acid. It is obtained in an amount of 21 grams; on heating in water it is readily soluble and decomposes at

I claim:
1. The products of the following formula:

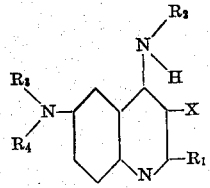

in which X stands for a member of the group consisting of nitro- and amino groups, $R_1$ for a member of the group consisting of methyl and hydrogen, $R_2$ for a member of the group consisting of alkyl and hydrogen, $R_3$ for a member of the group consisting of hydrogen and acid radical of the group consisting of lower aliphatic carboxylic acids and carboxylic acids of the benzene series, $R_4$ for a member of the group consisting of alkyl and hydrogen.

2. The products of the following formula:

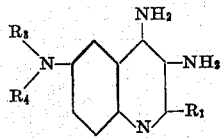

in which $R_1$ stands for a member of the group consisting of methyl and hydrogen, $R_3$ for a member of the group consisting of hydrogen and an acid radical of the group consisting of lower aliphatic carboxylic acids and carboxylic acids of the benzene series, $R_4$ for a member of the group consisting of alkyl and hydrogen.

3. The products of the following formula:

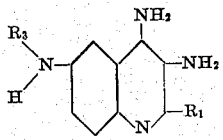

in which $R_1$ stands for a member of the group consisting of methyl and hydrogen, $R_3$ for an acid radical of the group consisting of lower aliphatic carboxylic acids and carboxylic acids of the benzene series, said products showing valuable therapeutic properties.

4. The products of the following formula:

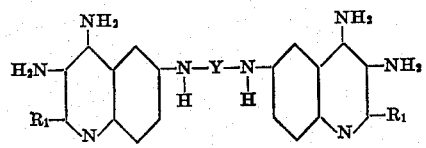

in which $R_1$ stands for a member of the group consisting of methyl and hydrogen and Y stands for the radical of a lower aliphatic carboxylic dibasic acid, said products showing valuable therapeutic properties.

5. The product of the following formula:

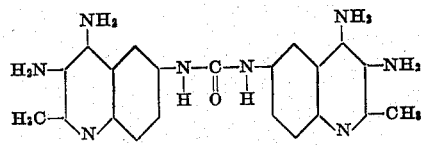

being almost insoluble in organic solvents and forming a colorless hydrochloride, decomposing at about 268° C. and showing valuable therapeutic properties.

6. The product of the following formula:

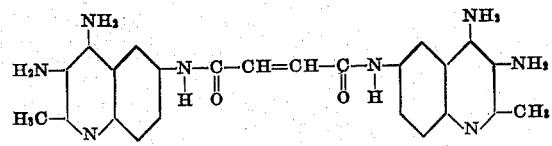

being a yellow powder, almost insoluble in organic solvents, decomposing at about 270° C. and showing valuable therapeutic properties.

7. The product of the following formula:

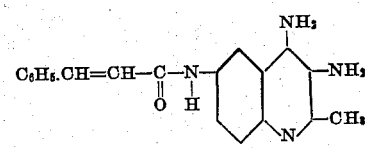

being of yellowish color, melting at about 262° C. to 263° C., while assuming a dark coloration and showing valuable therapeutic properties.

HEINRICH JENSCH.